United States Patent
Antonneau et al.

(10) Patent No.: US 10,919,792 B2
(45) Date of Patent: Feb. 16, 2021

(54) TREATMENT USING FIXED FILM PROCESSES AND BALLASTED SETTLING

(71) Applicants: Evoqua Water Technologies LLC, Warrendale, PA (US); Nathan Antonneau, Wauwatosa, WI (US); Timothy Lindemann, Jefferson, WI (US); Todd Schwingle, Franklin, WI (US); Michael Casey Whittier, Waukesha, WI (US); Steven E. Woodard, Cumberland, ME (US)

(72) Inventors: Nathan Antonneau, Wauwatosa, WI (US); Timothy Lindemann, Jefferson, WI (US); Todd Schwingle, Franklin, WI (US); Michael Casey Whittier, Waukesha, WI (US); Steven E. Woodard, Cumberland, ME (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 792 days.

(21) Appl. No.: 14/405,175

(22) PCT Filed: Mar. 15, 2013

(86) PCT No.: PCT/US2013/032313
§ 371 (c)(1),
(2) Date: Dec. 3, 2014

(87) PCT Pub. No.: WO2013/187979
PCT Pub. Date: Dec. 19, 2013

(65) Prior Publication Data
US 2015/0210574 A1 Jul. 30, 2015

Related U.S. Application Data

(60) Provisional application No. 61/658,102, filed on Jun. 11, 2012.

(51) Int. Cl.
*B01D 21/01* (2006.01)
*C02F 1/00* (2006.01)
(Continued)

(52) U.S. Cl.
CPC ................ *C02F 3/04* (2013.01); *B01D 21/01* (2013.01); *C02F 1/52* (2013.01); *C02F 3/08* (2013.01);
(Continued)

(58) Field of Classification Search
CPC .. C02F 1/52; C02F 1/56; C02F 1/5245; C02F 1/481; C02F 3/04; C02F 3/08;
(Continued)

(56) References Cited

U.S. PATENT DOCUMENTS

| 438,579 A | 10/1890 | Faunce et al. |
| 531,183 A | 12/1894 | Harris |

(Continued)

FOREIGN PATENT DOCUMENTS

| CN | 1686862 A | 10/2005 |
| CN | 101186410 A | 5/2008 |

(Continued)

OTHER PUBLICATIONS

Buchanan et al., "Aerobic Treatment of Wastewater and Aerobic Treatment Units," University Curriculum Development for Decentralized Wastewater Management Aerobic Treatment of Wastewater and Aerobic Treatment Units Buchanan and Seabloom, p. i-v and 1-22, Nov. 2004, [Retrieved on Mar. 9, 2011].

(Continued)

*Primary Examiner* — Angel Olivera

(57) ABSTRACT

A system and method is provided for water and wastewater treatment. The system comprises a fixed film biological process and a ballasted flocculation process.

15 Claims, 2 Drawing Sheets

(51) Int. Cl.
  *C02F 1/48* (2006.01)
  *C02F 1/52* (2006.01)
  *C02F 11/02* (2006.01)
  *C02F 3/04* (2006.01)
  *C02F 3/08* (2006.01)
  *C02F 3/10* (2006.01)
  *C02F 3/12* (2006.01)
  *C02F 9/00* (2006.01)
  C02F 1/56 (2006.01)
  C02F 101/20 (2006.01)

(52) U.S. Cl.
  CPC ............... *C02F 3/101* (2013.01); *C02F 9/00* (2013.01); *C02F 11/02* (2013.01); C02F 1/481 (2013.01); C02F 1/5245 (2013.01); C02F 1/56 (2013.01); C02F 3/082 (2013.01); C02F 3/085 (2013.01); C02F 3/121 (2013.01); C02F 2001/007 (2013.01); C02F 2101/203 (2013.01); C02F 2303/16 (2013.01); C02F 2305/12 (2013.01); Y02W 10/10 (2015.05); Y10T 29/49716 (2015.01)

(58) Field of Classification Search
  CPC .......... C02F 3/082; C02F 3/085; C02F 3/101; C02F 3/121; C02F 11/02; C02F 2001/007; C02F 2101/203; C02F 2303/16; C02F 2305/12; C02F 1/001; C02F 1/5236; C02F 1/78; C02F 3/06; B01D 21/01; Y02W 10/15; Y10T 29/49716
  See application file for complete search history.

(56) References Cited

U.S. PATENT DOCUMENTS

| | | |
|---|---|---|
| 653,010 A | 7/1900 | Koyl |
| 728,062 A | 5/1903 | Wilson |
| 1,064,807 A | 6/1913 | Yost |
| 1,310,461 A | 7/1919 | Williams |
| 1,383,287 A | 7/1921 | Campbell |
| 1,401,288 A | 12/1921 | Sodeau |
| 1,948,080 A | 2/1934 | Thomas |
| 2,065,123 A | 12/1936 | Downes |
| 2,129,267 A | 9/1938 | Fischer |
| 2,232,294 A | 2/1941 | Urbain et al. |
| 2,232,296 A | 2/1941 | Urbain et al. |
| 2,268,461 A | 12/1941 | Nichols |
| 2,285,697 A * | 6/1942 | Durdin ............... B01F 3/04773 210/622 |
| 2,326,575 A | 8/1943 | Stearns |
| 2,359,748 A | 10/1944 | Clemens |
| 2,391,494 A | 12/1945 | Walker |
| 2,401,924 A | 6/1946 | Goetz |
| 2,564,515 A | 8/1951 | Vogel |
| 2,597,561 A | 5/1952 | Blind |
| 2,652,925 A | 9/1953 | Vermeiren |
| 2,713,028 A | 7/1955 | Jenks |
| 2,758,715 A | 8/1956 | Fowler |
| 2,825,464 A | 3/1958 | Mack |
| 2,912,107 A | 11/1959 | Palm |
| 2,945,590 A | 7/1960 | Stearns |
| 2,952,361 A | 9/1960 | Newton |
| 3,066,095 A | 11/1962 | Hronas |
| 3,080,264 A | 3/1963 | Zimmie |
| 3,142,638 A | 7/1964 | Blaisdell et al. |
| 3,228,878 A | 1/1966 | Moody |
| 3,350,302 A | 10/1967 | Demeter et al. |
| 3,575,852 A | 4/1971 | Hughes |
| 3,617,561 A | 11/1971 | Fanselow |
| 3,622,461 A | 11/1971 | Wagner et al. |
| 3,627,678 A | 12/1971 | Marston et al. |
| 3,676,337 A | 7/1972 | Kolm |
| 3,690,454 A | 9/1972 | Bekhtle et al. |
| 3,693,795 A | 9/1972 | Robinson et al. |
| 3,697,420 A | 10/1972 | Blaisdell et al. |
| 3,703,958 A | 11/1972 | Kolm |
| 3,767,351 A | 10/1973 | Blaser |
| 3,819,589 A | 6/1974 | Fauke et al. |
| 3,856,666 A | 12/1974 | Yashima et al. |
| 3,886,064 A | 5/1975 | Kosonen |
| 3,887,457 A | 6/1975 | Marston et al. |
| 3,920,543 A | 11/1975 | Marston et al. |
| 3,929,632 A | 12/1975 | Buriks et al. |
| 3,929,635 A | 12/1975 | Buriks et al. |
| 3,950,319 A | 4/1976 | Schmidt et al. |
| 3,951,807 A | 4/1976 | Sanderson |
| 3,959,133 A | 5/1976 | Fulton |
| 3,983,033 A | 9/1976 | de Latour |
| 4,024,040 A | 5/1977 | Phalangas et al. |
| 4,025,432 A | 5/1977 | Nolan et al. |
| 4,033,864 A | 7/1977 | Nolan et al. |
| 4,046,681 A | 9/1977 | Marston et al. |
| 4,066,991 A | 1/1978 | Marston et al. |
| 4,089,779 A | 5/1978 | Neal |
| 4,110,208 A | 8/1978 | Neal |
| 4,139,456 A | 2/1979 | Yabuuchi et al. |
| 4,142,970 A | 3/1979 | von Hagel et al. |
| 4,151,090 A | 4/1979 | Brigante |
| 4,153,559 A | 5/1979 | Sanderson |
| 4,167,480 A | 9/1979 | Mach |
| 4,176,042 A | 11/1979 | Fahlstrom |
| 4,190,539 A | 2/1980 | Besik |
| 4,193,866 A | 3/1980 | Slusarczuk et al. |
| 4,204,948 A | 5/1980 | Wechsler et al. |
| 4,274,968 A | 6/1981 | Grutsch et al. |
| 4,290,898 A | 9/1981 | von Hagel et al. |
| 4,297,484 A | 10/1981 | Quinlan |
| 4,320,012 A | 3/1982 | Palm et al. |
| 4,339,347 A | 7/1982 | Quinlan |
| 4,341,657 A | 7/1982 | Quinlan |
| 4,343,730 A | 8/1982 | Becker et al. |
| 4,357,237 A | 11/1982 | Sanderson |
| 4,358,382 A | 11/1982 | Quinlan |
| 4,359,382 A | 11/1982 | Morgan |
| 4,377,483 A | 3/1983 | Yamashita et al. |
| 4,388,195 A | 6/1983 | von Hagel et al. |
| 4,402,833 A | 9/1983 | Bennett et al. |
| 4,440,649 A | 4/1984 | Loftin et al. |
| 4,454,047 A | 6/1984 | Becker et al. |
| 4,465,597 A | 8/1984 | Herman et al. |
| 4,482,459 A | 11/1984 | Shiver |
| 4,502,958 A | 3/1985 | Sasaki |
| 4,522,643 A | 6/1985 | Quinlan |
| 4,563,286 A | 1/1986 | Johnson et al. |
| 4,579,655 A | 4/1986 | Louboutin et al. |
| 4,588,508 A | 5/1986 | Allenson et al. |
| 4,595,506 A | 6/1986 | Kneer |
| 4,626,354 A | 12/1986 | Hoffman et al. |
| 4,654,139 A | 3/1987 | Baba et al. |
| 4,655,933 A | 4/1987 | Johnson et al. |
| 4,686,035 A | 8/1987 | Estabrook |
| 4,689,154 A | 8/1987 | Zimberg |
| 4,699,951 A | 10/1987 | Allenson et al. |
| 4,735,725 A | 4/1988 | Reischl et al. |
| 4,752,401 A | 6/1988 | Bodenstein |
| 4,765,900 A | 8/1988 | Schwoyer et al. |
| 4,765,908 A | 8/1988 | Monick et al. |
| 4,783,265 A | 11/1988 | Timmons |
| 4,795,557 A | 1/1989 | Bourbigot et al. |
| 4,827,890 A | 5/1989 | Pociask et al. |
| 4,843,105 A | 6/1989 | Reischl et al. |
| 4,849,128 A | 7/1989 | Timmons et al. |
| 4,851,123 A | 7/1989 | Mishra |
| 4,864,075 A | 9/1989 | Thompson et al. |
| 4,872,993 A | 10/1989 | Harrison |
| 4,874,508 A | 10/1989 | Fritz |
| 4,882,064 A | 11/1989 | Dixon et al. |
| 4,921,597 A * | 5/1990 | Lurie ..................... B03C 1/14 209/223.2 |
| 4,921,613 A | 5/1990 | Nordberg et al. |
| 4,927,543 A | 5/1990 | Bablon et al. |

(56) References Cited

U.S. PATENT DOCUMENTS

| | | | |
|---|---|---|---|
| 4,938,876 A | 7/1990 | Ohsol | |
| 4,940,550 A | 7/1990 | Watson | |
| 4,944,278 A | 7/1990 | Woodard | |
| 4,944,279 A | 7/1990 | Woodard | |
| 4,956,099 A | 9/1990 | Thompson et al. | |
| 4,981,593 A | 1/1991 | Priestley et al. | |
| 5,009,791 A | 4/1991 | Lin et al. | |
| 5,013,451 A | 5/1991 | Thompson et al. | |
| 5,019,274 A | 5/1991 | Thompson et al. | |
| 5,023,012 A | 6/1991 | Buchan et al. | |
| 5,026,483 A | 6/1991 | Thompson et al. | |
| 5,055,194 A | 10/1991 | Goetz et al. | |
| 5,064,531 A | 11/1991 | Wang et al. | |
| 5,069,783 A | 12/1991 | Wang et al. | |
| 5,084,733 A | 1/1992 | Katoh et al. | |
| 5,089,120 A | 2/1992 | Eberhardt | |
| 5,089,227 A | 2/1992 | Thompson et al. | |
| 5,089,619 A | 2/1992 | Thompson et al. | |
| 5,112,494 A | 5/1992 | Yan | |
| 5,112,499 A | 5/1992 | Murray et al. | |
| 5,126,050 A | 6/1992 | Irvine et al. | |
| 5,149,438 A | 9/1992 | Hebert | |
| 5,187,326 A | 2/1993 | Shirai | |
| 5,234,603 A | 8/1993 | Potts | |
| 5,266,200 A | 11/1993 | Reid | |
| 5,298,168 A | 3/1994 | Guess | |
| 5,307,938 A | 5/1994 | Lillmars | |
| 5,310,642 A | 5/1994 | Vargas et al. | |
| 5,369,072 A | 11/1994 | Benjamin et al. | |
| 5,377,845 A | 1/1995 | Hamen et al. | |
| 5,383,539 A | 1/1995 | Bair et al. | |
| 5,395,527 A | 3/1995 | Desjardins | |
| 5,397,476 A | 3/1995 | Bradbury et al. | |
| 5,462,670 A | 10/1995 | Guess | |
| 5,545,330 A | 8/1996 | Ehrlich | |
| 5,560,493 A | 10/1996 | Perry | |
| 5,593,590 A | 1/1997 | Steyskal | |
| 5,595,666 A | 1/1997 | Kochen et al. | |
| 5,596,392 A | 1/1997 | Danzuka | |
| 5,597,479 A | 1/1997 | Johnson | |
| 5,616,241 A | 4/1997 | Khudenko | |
| 5,616,250 A | 4/1997 | Johnson et al. | |
| 5,637,221 A | 6/1997 | Coyne | |
| 5,693,461 A | 12/1997 | Bagchi et al. | |
| 5,702,809 A | 12/1997 | Tixier et al. | |
| 5,730,864 A | 3/1998 | Delsalle et al. | |
| 5,731,134 A | 3/1998 | Honan et al. | |
| 5,766,459 A * | 6/1998 | Adams, Jr. | C02F 3/1242 210/195.4 |
| 5,770,091 A | 6/1998 | Binot et al. | |
| 5,779,908 A | 7/1998 | Anderson et al. | |
| 5,800,717 A | 9/1998 | Ramsay et al. | |
| 5,805,965 A | 9/1998 | Tsuda et al. | |
| 5,840,195 A | 11/1998 | Delsalle et al. | |
| 5,856,072 A | 1/1999 | Leone et al. | |
| 5,893,355 A | 4/1999 | Glover et al. | |
| 5,925,290 A | 7/1999 | Hills | |
| 5,976,375 A | 11/1999 | Dorica et al. | |
| 5,976,771 A | 11/1999 | Kosugi et al. | |
| 6,010,631 A | 1/2000 | Delsalle et al. | |
| 6,030,761 A | 2/2000 | Taguchi et al. | |
| 6,093,318 A | 7/2000 | Saho et al. | |
| 6,099,738 A | 8/2000 | Wechsler et al. | |
| 6,149,014 A | 11/2000 | Mankosa et al. | |
| 6,151,467 A | 11/2000 | Yamaguchi | |
| 6,160,976 A | 12/2000 | Karakama et al. | |
| 6,185,393 B1 | 2/2001 | Karakama et al. | |
| 6,210,587 B1 | 4/2001 | Vion | |
| 6,210,588 B1 | 4/2001 | Vion | |
| 6,217,773 B1 | 4/2001 | Graham | |
| 6,221,253 B1 | 4/2001 | Fukase et al. | |
| 6,221,262 B1 | 4/2001 | MacDonald et al. | |
| 6,228,269 B1 | 5/2001 | Cort | |
| 6,228,565 B1 | 5/2001 | Ohzeki et al. | |
| 6,251,576 B1 | 6/2001 | Taguchi et al. | |
| 6,277,285 B1 | 8/2001 | Vion | |
| 6,290,849 B1 | 9/2001 | Rykaer et al. | |
| 6,379,549 B1 | 4/2002 | LePoder et al. | |
| 6,383,370 B1 | 5/2002 | Keever et al. | |
| 6,386,781 B1 | 5/2002 | Gueret | |
| 6,406,624 B1 | 6/2002 | DeVos | |
| 6,423,485 B1 | 7/2002 | Yamada et al. | |
| 6,432,303 B1 | 8/2002 | Chesner et al. | |
| 6,447,686 B1 | 9/2002 | Choi et al. | |
| 6,472,132 B1 | 10/2002 | Yamada et al. | |
| 6,478,955 B1 | 11/2002 | Saho et al. | |
| 6,485,652 B1 | 11/2002 | Le Poder et al. | |
| 6,517,714 B2 | 2/2003 | Streat | |
| 6,576,145 B2 | 6/2003 | Conaway et al. | |
| 6,613,232 B2 | 9/2003 | Chesner et al. | |
| 6,645,386 B1 | 11/2003 | Moreau et al. | |
| 6,689,277 B2 | 2/2004 | Streat | |
| 6,692,173 B2 | 2/2004 | Gueret | |
| 6,706,467 B2 | 3/2004 | Howe et al. | |
| 6,740,245 B2 | 5/2004 | Johnson | |
| 6,759,018 B1 | 7/2004 | Arno et al. | |
| 6,783,679 B1 | 8/2004 | Rozich | |
| 6,811,885 B1 | 11/2004 | Andriessen et al. | |
| 6,824,692 B2 | 11/2004 | Binot et al. | |
| 6,832,691 B2 | 12/2004 | Miles et al. | |
| 6,875,351 B2 | 4/2005 | Arnaud | |
| 6,878,856 B2 | 4/2005 | Kim et al. | |
| 6,896,815 B2 | 5/2005 | Cort | |
| 6,902,678 B2 | 6/2005 | Tipton | |
| 6,919,031 B2 | 7/2005 | Blumenschein et al. | |
| 6,923,901 B2 | 8/2005 | Leffler et al. | |
| 6,960,294 B2 | 11/2005 | Arnaud | |
| 6,966,993 B2 | 11/2005 | Binot | |
| 6,968,138 B2 | 11/2005 | Akutsu | |
| 7,001,525 B2 | 2/2006 | Binot et al. | |
| 7,083,715 B2 | 8/2006 | Binot | |
| 7,153,431 B2 | 12/2006 | Daugherty | |
| 7,160,448 B2 | 1/2007 | Johnson | |
| 7,210,581 B2 | 5/2007 | Robinson et al. | |
| 7,244,362 B2 | 7/2007 | Binot | |
| 7,255,793 B2 | 8/2007 | Cort | |
| 7,276,165 B2 | 10/2007 | Morgoun | |
| 7,309,435 B2 | 12/2007 | Rozich | |
| 7,311,841 B2 | 12/2007 | Binot et al. | |
| 7,323,108 B1 * | 1/2008 | Garbett | C02F 9/00 210/607 |
| 7,407,582 B2 | 8/2008 | Sun | |
| 7,407,593 B2 | 8/2008 | Frederick, Jr. et al. | |
| 7,438,817 B2 | 10/2008 | Nagghappan et al. | |
| 7,449,105 B2 | 11/2008 | Hastings | |
| 7,476,324 B2 | 1/2009 | Ciampi et al. | |
| 7,494,592 B2 | 2/2009 | Deskins | |
| 7,563,366 B2 | 7/2009 | Sun | |
| 7,601,261 B2 | 10/2009 | Palacios Donaque | |
| 7,608,190 B1 | 10/2009 | Banerjee et al. | |
| 7,625,490 B2 | 12/2009 | Cort | |
| 7,648,637 B1 | 1/2010 | Sauvignet et al. | |
| 7,648,638 B2 | 1/2010 | Essemiani et al. | |
| 7,651,620 B2 | 1/2010 | Vion | |
| 7,678,278 B2 | 3/2010 | Binot et al. | |
| 7,686,079 B2 | 3/2010 | Gamache et al. | |
| 7,686,960 B2 | 3/2010 | Cort | |
| 7,691,261 B2 | 4/2010 | Deskins | |
| 7,691,269 B2 | 4/2010 | Cort | |
| 7,695,623 B2 | 4/2010 | Woodard et al. | |
| 7,695,630 B2 | 4/2010 | de Guevara | |
| 7,704,390 B2 | 4/2010 | Leffler et al. | |
| 7,704,399 B2 | 4/2010 | Condit | |
| 7,722,843 B1 | 5/2010 | Srinivasachar | |
| 7,729,778 B2 | 6/2010 | Eggers et al. | |
| 7,820,025 B2 | 10/2010 | Ciampi et al. | |
| 7,820,053 B2 | 10/2010 | Cort | |
| 7,820,054 B2 | 10/2010 | Hastings et al. | |
| 7,828,976 B2 | 11/2010 | Banerjee et al. | |
| 8,012,582 B2 | 9/2011 | Luo et al. | |
| 8,056,728 B2 | 11/2011 | Riise et al. | |
| 8,470,172 B2 | 6/2013 | Woodard et al. | |
| 8,506,800 B2 | 8/2013 | Woodard et al. | |
| 8,540,877 B2 | 9/2013 | Woodard | |

(56) References Cited

U.S. PATENT DOCUMENTS

| | | |
|---|---|---|
| 2001/0030160 A1 | 10/2001 | Wechsler et al. |
| 2002/0003115 A1 | 1/2002 | Conaway et al. |
| 2002/0017483 A1 | 2/2002 | Chesner et al. |
| 2002/0030019 A1 | 3/2002 | Keever et al. |
| 2002/0054783 A1 | 5/2002 | Gueret |
| 2002/0088758 A1 | 7/2002 | Blumenschein et al. |
| 2002/0148780 A1 | 10/2002 | Tiemeyer |
| 2002/0158025 A1 | 10/2002 | Streat |
| 2002/0170816 A1 | 11/2002 | Leffler et al. |
| 2002/0185452 A1 | 12/2002 | Johnson |
| 2002/0190004 A1 | 12/2002 | Wechsler et al. |
| 2003/0082084 A1 | 5/2003 | Cort |
| 2003/0089667 A1 | 5/2003 | Binot et al. |
| 2003/0132160 A1 | 7/2003 | Khudenko |
| 2003/0150817 A1 | 8/2003 | Keever et al. |
| 2003/0222027 A1 | 12/2003 | Streat |
| 2003/0224301 A1 | 12/2003 | Howe et al. |
| 2004/0055959 A1 | 3/2004 | Wechsler et al. |
| 2004/0055961 A1 | 3/2004 | Binot |
| 2004/0060876 A1 | 4/2004 | Tipton |
| 2004/0129642 A1 | 7/2004 | Binot |
| 2004/0144730 A1 | 7/2004 | Binot et al. |
| 2004/0149653 A1 | 8/2004 | Johnson et al. |
| 2004/0206680 A1 | 10/2004 | Johnson |
| 2004/0206699 A1 | 10/2004 | Ho et al. |
| 2004/0213721 A1 | 10/2004 | Arno et al. |
| 2005/0005471 A1 | 1/2005 | Pan |
| 2005/0035030 A1 | 2/2005 | Oder et al. |
| 2005/0045534 A1 | 3/2005 | Kin et al. |
| 2005/0051488 A1 | 3/2005 | Nagghappan et al. |
| 2005/0101719 A1 | 5/2005 | Ishihara |
| 2005/0103719 A1 | 5/2005 | Binot et al. |
| 2005/0131266 A1 | 6/2005 | Carman et al. |
| 2005/0173354 A1 | 8/2005 | Binot et al. |
| 2005/0194311 A1 | 9/2005 | Rozich |
| 2005/0218056 A1 | 10/2005 | Binot |
| 2005/0230299 A1 | 10/2005 | Saho et al. |
| 2005/0258103 A1 | 11/2005 | Cort |
| 2005/0271575 A1 | 12/2005 | Ciampi et al. |
| 2005/0277712 A1 | 12/2005 | Daly |
| 2005/0282144 A1 | 12/2005 | Wechsler et al. |
| 2006/0006114 A1 | 1/2006 | Deskins |
| 2006/0018273 A1 | 1/2006 | Yamada et al. |
| 2006/0108273 A1 | 5/2006 | Perri et al. |
| 2006/0108283 A1 | 5/2006 | Johnson et al. |
| 2006/0138047 A1 | 6/2006 | Morgoun |
| 2006/0175252 A1 | 8/2006 | Upendrakumar et al. |
| 2006/0186056 A1 | 8/2006 | Ivan |
| 2006/0213832 A1 | 9/2006 | Hudson et al. |
| 2006/0254770 A1 | 11/2006 | Hou |
| 2006/0270888 A1 | 11/2006 | Carman et al. |
| 2006/0289357 A1 | 12/2006 | Wechsler et al. |
| 2007/0039894 A1 | 2/2007 | Cort |
| 2007/0062883 A1 | 3/2007 | Frederick et al. |
| 2007/0108132 A1 | 5/2007 | de Guevara |
| 2007/0114184 A1 | 5/2007 | Essemiani et al. |
| 2007/0119776 A1 | 5/2007 | Isaka et al. |
| 2007/0138093 A1 | 6/2007 | Bossier et al. |
| 2007/0163955 A1 | 7/2007 | Sun |
| 2008/0019780 A1 | 1/2008 | Hastings |
| 2008/0073267 A1 | 3/2008 | Cort |
| 2008/0073268 A1 | 3/2008 | Cort |
| 2008/0073270 A1 | 3/2008 | Smith |
| 2008/0073271 A1 | 3/2008 | Cort |
| 2008/0073278 A1* | 3/2008 | Cort ................ C02F 1/488 210/695 |
| 2008/0073279 A1 | 3/2008 | Cort |
| 2008/0073280 A1 | 3/2008 | Cort |
| 2008/0073281 A1 | 3/2008 | Cort |
| 2008/0073282 A1 | 3/2008 | Cort |
| 2008/0073283 A1 | 3/2008 | Cort |
| 2008/0073284 A1 | 3/2008 | Cort |
| 2008/0078721 A1 | 4/2008 | Binot et al. |
| 2008/0135491 A1 | 6/2008 | Cort |
| 2008/0150518 A1 | 6/2008 | Becker et al. |
| 2008/0156709 A1 | 7/2008 | Johnson |
| 2008/0164183 A1 | 7/2008 | Marston et al. |
| 2008/0164184 A1 | 7/2008 | Marston et al. |
| 2008/0203015 A1 | 8/2008 | Marston et al. |
| 2008/0210613 A1 | 9/2008 | Wechsler et al. |
| 2008/0217244 A1 | 9/2008 | Gaid |
| 2008/0257810 A1 | 10/2008 | Sun |
| 2008/0272065 A1 | 11/2008 | Johnson |
| 2008/0290030 A1 | 11/2008 | Nagghappan et al. |
| 2008/0296228 A1 | 12/2008 | Sauvignet et al. |
| 2008/0314820 A1 | 12/2008 | Prulhiere et al. |
| 2008/0314830 A1 | 12/2008 | Banerjee et al. |
| 2009/0047076 A1 | 2/2009 | Hastings |
| 2009/0050570 A1 | 2/2009 | Sauvignet |
| 2009/0065404 A1 | 3/2009 | Paspek, Jr. et al. |
| 2009/0084730 A1 | 4/2009 | Mabille et al. |
| 2009/0098262 A1 | 4/2009 | Mabille et al. |
| 2009/0127180 A1 | 5/2009 | Deskins |
| 2009/0178979 A1 | 7/2009 | Hastings et al. |
| 2009/0189599 A1 | 7/2009 | Fujii et al. |
| 2009/0206040 A1 | 8/2009 | Berg et al. |
| 2009/0218281 A1 | 9/2009 | Sauvignet et al. |
| 2009/0261037 A1 | 10/2009 | Clifford, III et al. |
| 2009/0272693 A1 | 11/2009 | Mabille et al. |
| 2009/0299143 A1 | 12/2009 | Conlon et al. |
| 2009/0301948 A1 | 12/2009 | Essemiani et al. |
| 2009/0308815 A1 | 12/2009 | Sauvignet et al. |
| 2010/0038081 A1 | 2/2010 | Gamache et al. |
| 2010/0047671 A1 | 2/2010 | Chiang et al. |
| 2010/0057085 A1 | 3/2010 | Holcomb et al. |
| 2010/0072142 A1 | 3/2010 | Lean et al. |
| 2010/0096335 A1 | 4/2010 | Sauvignet et al. |
| 2010/0101309 A1 | 4/2010 | Klyamkin et al. |
| 2010/0102006 A1 | 4/2010 | Quevillon |
| 2010/0155327 A1 | 6/2010 | Woodard et al. |
| 2010/0213123 A1 | 8/2010 | Marston et al. |
| 2010/0219372 A1 | 9/2010 | Hook et al. |
| 2010/0251571 A1 | 10/2010 | Woodard |
| 2010/0274209 A1 | 10/2010 | Roe et al. |
| 2011/0036771 A1 | 2/2011 | Woodard |
| 2011/0147304 A1* | 6/2011 | Sauvignet ............ C02F 1/52 210/608 |
| 2012/0067824 A1 | 3/2012 | Berg et al. |
| 2013/0020255 A1 | 1/2013 | Woodard |

FOREIGN PATENT DOCUMENTS

| | | |
|---|---|---|
| CN | 101244884 A | 8/2008 |
| CN | 101296870 A | 10/2008 |
| CN | 101309870 A | 11/2008 |
| DE | 973611 C | 4/1960 |
| DE | 3513800 A1 | 10/1986 |
| DE | 4207335 A1 | 9/1993 |
| DE | 19600647 A1 | 7/1997 |
| EP | 0087223 A1 | 8/1983 |
| EP | 0139572 A1 | 5/1985 |
| EP | 266098 A2 | 5/1988 |
| EP | 392321 A1 | 10/1990 |
| EP | 392322 A1 | 10/1990 |
| EP | 1785400 A1 | 5/2007 |
| EP | 2165980 A1 | 3/2010 |
| FR | 1411792 A | 9/1965 |
| FR | 2378550 A1 | 8/1978 |
| FR | 2719235 A1 | 11/1995 |
| GB | 910476 A | 11/1962 |
| JP | 07-299495 A | 11/1995 |
| JP | 08-257583 A | 10/1996 |
| JP | 11-169866 A | 6/1999 |
| JP | 2000-233198 A | 8/2000 |
| JP | 2001-170404 A | 6/2001 |
| JP | 2003-010874 A | 1/2003 |
| SU | 1136839 A1 | 1/1985 |
| WO | 199312041 A1 | 6/1993 |
| WO | 1997035654 A1 | 10/1997 |
| WO | 1997035655 A1 | 10/1997 |
| WO | 1998003433 A1 | 1/1998 |
| WO | 199919261 A1 | 4/1999 |
| WO | 199931016 A1 | 6/1999 |
| WO | 200114260 A1 | 3/2001 |

(56) References Cited

FOREIGN PATENT DOCUMENTS

| WO | 200128931 A1 | 4/2001 |
| WO | 2001040121 A1 | 6/2001 |
| WO | 200200556 A1 | 1/2002 |
| WO | 2002042223 A1 | 5/2002 |
| WO | 2005077835 A1 | 8/2005 |
| WO | 2005087381 A1 | 9/2005 |
| WO | 200608634 A2 | 8/2006 |
| WO | 2006102362 A2 | 9/2006 |
| WO | 2007059141 A2 | 5/2007 |
| WO | 2007098298 A2 | 8/2007 |
| WO | 2007103409 A2 | 9/2007 |
| WO | 2008022192 A2 | 2/2008 |
| WO | 2008039711 A2 | 4/2008 |
| WO | 2008039936 A2 | 4/2008 |
| WO | 2008085196 A2 | 7/2008 |
| WO | 2008085197 A1 | 7/2008 |
| WO | 2008086009 A1 | 7/2008 |
| WO | 2008086010 A1 | 7/2008 |
| WO | 2009083346 A1 | 7/2009 |
| WO | 2010027895 A2 | 3/2010 |
| WO | 2010081903 A1 | 7/2010 |
| WO | 2010086249 A1 | 8/2010 |
| WO | 2011005927 A1 | 1/2011 |
| WO | 2011031305 A1 | 3/2011 |

OTHER PUBLICATIONS

Catlow et al. "Ballasted Biological Treatment Process Removes Nutrients and Doubles Plant Capacity". WEFTEC Conference (Oct. 2008).

http://www.envirosim.com/includes/weftec08.htm, downloaded Dec. 16, 2012.

Kolm et al., "High Gradient Magnetic Separation," Scientific American, Nov. 1975, vol. 233, No. 5, 10 pages (unnumbered).

Lubenow et al. "Maximizing Nutrient Removal in an Existing SBR with a Full-Scale BioMag Demonstration". WEFTEC Conference. Date Unknown.

Moody et al. "Beyond Desktop Evaluation: Key Design Criteria for Mixing and Settling of Magnetite-Impregnated Mixed Liquor". WEFTEC Conference 2011.

Raskin et al., "Quantification of Methanogenic Groups in Anaerobic Biological Reactors by Oligonucleotide Probe Hybridization," Applied and Environmental Microbiology, Apr. 1994, vol. 60, No. 4, pp. 1241-1248.

Sakai et al., "A Sewage Treatment Process Using Highly Condensed Activated Sludge with an Apparatus for Magnetic Separation," 1994, Journal of Fermentation and Bioengineering, vol. 78, No. 1, pp. 120-122.

Sakai et al., "Magnetic Forced Sedimentation of Flocs in Activated Sludge Supplemented with Ferromagnetic Powder of Iron Oxide," 1991, Journal of Fermentation and Bioengineering, vol. 71, No. 3, pp. 208-210.

Sakai et al., "Recovery and Reuse of Ferromagnetic Powder Supplemented in Activated Sludge for Magnetic Separation," Dept. of Applied Chemistry, Faculty of Engineering, Utsunomiya University, Japan, Submitted: Jun. 28, 1991; Accepted: Oct. 22, 1991, pp. 1-11. Japanese language original (pp. 52-56), and translated English language copy (pp. 1-11).

Sakai et al., "Sewage Treatment under Conditions of Balancing Microbial Growth and Cell Decay with a High Concentration of Activated Sludge Supplemented with Ferromagnetic Powder," 1992, Journal of Fermentation and Bioengineering, vol. 74, No. 6, pp. 413-315.

Sakai et al., "Simultaneous Removal of Organic and Nitrogen Compounds in Intermittently Aerated Activated Sludge Process Using Magnetic Separation," 1997, Technical Note Wat. Res., vol. 31, No. 8, pp. 2113-2116.

Tozer, "Study of Five Phosphorus Removal Processes," The Georgia Operator, vol. 45, No. (Winter 2008).

www.ingentaconnect.com/content/wef/wefproc/2009/00002009/00000004/art0020, downloaded Dec. 16, 2012.

Renjun, Xiang, Chinese Doctoral Dissertations & Master's Theses Full-text Database (Master) Engineering Science and Technology I, pp. B027-B173, Sep. 15, 2004 (English Abstract, 2 pages).

Tessier, Pierre, "Examination Search Report", Canadian Patent Application No. 2,873,081, dated Jan. 28, 2020, 3 pages.

\* cited by examiner

TREATMENT USING FIXED FILM PROCESSES AND BALLASTED SETTLING

FIELD OF TECHNOLOGY

One or more aspects of the disclosure relate generally to water and wastewater treatment, and more particularly to systems and methods for water and wastewater treatment using fixed film processes and ballasted settling.

SUMMARY

A system for treating wastewater is provided. The system comprises a fixed film reactor fluidly connected to a source of wastewater and configured to provide a fixed film effluent. The system further comprises a source of ballast fluidly connected to the fixed film effluent and configured to provide a ballasted effluent. A clarifier is provided in the system that is fluidly connected to the ballasted effluent. The clarifier comprises a treated effluent outlet and a ballasted solids outlet and is configured to separate a treated effluent from a ballasted solids.

A method for treating a wastewater is also provided. The method comprises introducing a source of wastewater to a fixed film reactor to provide a fixed film effluent. The method further comprises adding a ballast to provide a ballasted effluent. The method further comprises separating the ballasted effluent into a treated effluent and a ballasted solids in a clarifier, and separating the ballasted solids into a recovered ballast and a ballast-free solids. The method further comprises adding the recovered ballast to the coagulated effluent.

A method for retrofitting a wastewater treatment system is also provided. The wastewater treatment comprises a fixed film bioreactor and a clarifier positioned downstream of the fixed film bioreactor. The clarifier comprises a solids outlet. The method for retrofitting comprises installing a coagulation tank in the clarifier, and installing a ballast feed tank connected downstream of the coagulant tank in the clarifier. The method of retrofitting further comprises connecting the solids outlet of the clarifier to the ballast feed tank.

DESCRIPTION OF THE DRAWINGS

The accompanying drawings are not intended to be drawn to scale. For purposes of clarity, not every component may be labeled in the drawings, nor is every component of each embodiment of the disclosure shown where illustration is not necessary to allow those of ordinary skill in the art to understand the disclosure.

In the drawings.

DETAILED DESCRIPTION

Figure 1:
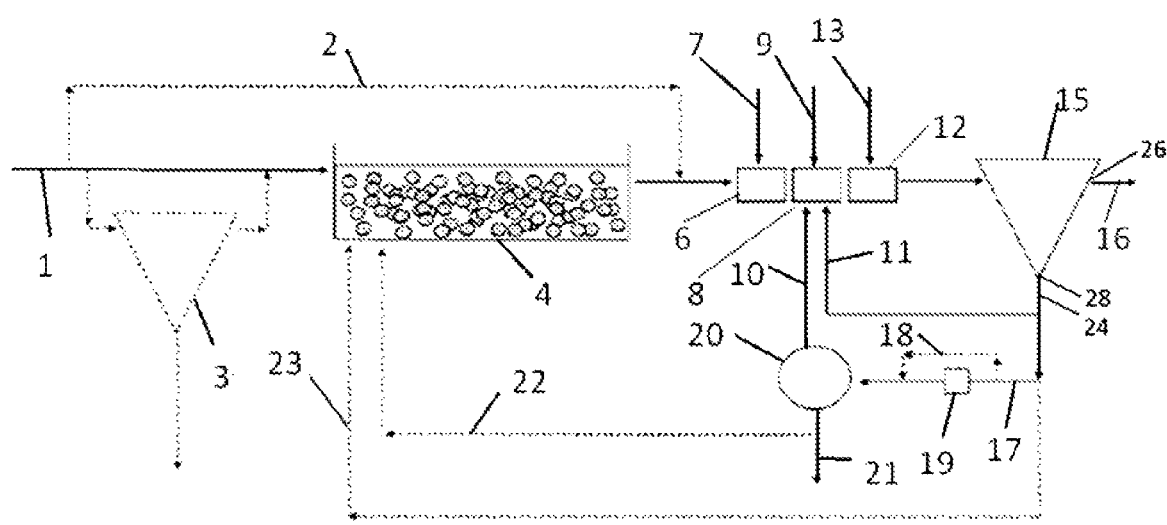
FIG. 1 presents a schematic of a treatment system implementing a fixed film process, ballasted settling, and recovery of ballast in accordance with one or more embodiments of the disclosure.

Systems and methods are provided for treating water or wastewater. The systems and methods may comprise treating a water or wastewater in a fixed film reactor, also referred to as a fixed film biological system or attached growth system. The systems and methods may further comprise treating the effluent from the fixed film biological system in a ballasted settling process, or a ballasted flocculation system.

A fixed film biological system may oxidize and reduce soluble substrate, eliminating impurities and producing solids. Fixed film processes may maintain biological growth on a surface or inert carrier or sheet and the treated effluent from the fixed film bioreactor may contain about 50 milligrams per liter (mg/l) to about 300 mg/l of biological solids. In certain embodiments, the treated effluent may contain between about 100 mg/l to about 200 mg/l. In certain embodiments, the treated effluent from the fixed film bioreactor may contain about 50 mg/l to about 2,000 mg/l of biological solids Examples of fixed film processes include, without limitation, moving bed bioreactors (MBBR's), trickling filters, and rotating biological contactors. Typically, wastewater is filtered through a primary or coarse screen and/or is treated in a primary clarification unit. Effluent of these primary processes or a raw wastewater may enter a fixed film biological system where soluble substrate is oxidized or reduced to biological solids in the form of slough from the fixed biomass on the inert carrier or sheet of the fixed film reactor. Aeration may be supplied in aerobic zones to supply oxygen and mixing to the system. In anaerobic, anoxic, or aerated anoxic based systems, mixers or mixers with aeration may be provided to maintain mixing throughout.

The fixed film biological system may provide an effluent comprising biological solids, often referred to as slough, which requires separation from a treated effluent in a downstream process. While fixed film processes have a small footprint, effluent biological solids from the process are often difficult to settle with conventional sedimentation processes frequently requiring a large settling area. Clarification, therefore, is often the limiting step in the rate of wastewater treatment involving fixed film biological systems or fixed film reactors.

Ballasted flocculation systems or ballasted settling systems may comprise the addition of a coagulant, ballast, and, optionally, a flocculant to improve the removal of dissolved, colloidal, particulate and microbiological solids. In certain embodiments, the coagulant may be optional. For example, ballast and flocculant may be added, without coagulant. In other embodiments, ballast may be added without coagulant and flocculant. In other embodiments, ballast and coagulant may be added, without flocculant. The precipitation and enhanced settlability of ballasted solids provides for a small clarification step, which may allow for a small footprint system comprising biological and clarification steps. According to embodiments of the present disclosure, ballasted flocculation systems may eliminate the need to provide a secondary clarifier directly downstream of a fixed film biological system or reactor. Further, the ballasted flocculation system may be installed between the fixed film bioreactor and the secondary clarifier, thereby using the existing secondary clarifier as the ballasted flocculation clarifier and eliminating the need for a new clarifier.

Flocculation may be a process of contact and adhesion whereby particles and colloids in liquid such as a water or wastewater form larger-size clusters of material. Particles may cluster together into a floc. A flocculant may comprise a material or a chemical that promotes flocculation by causing colloids and particles or other suspended particles in liquids to aggregate, forming a floc. Polymer may be used as flocculants. For example, acrylic acid/acrylamide copolymers and modified polyacrylamides may be used.

Coagulation may be a process of consolidating particles, such as colloidal solids. Coagulants may include cations, such as multivalent cations. They may include cations such as aluminum, iron, calcium or magnesium (positively charged molecules) that may interact with negatively charged particles and molecules that reduce the barriers to aggregation. Examples of coagulants include bentonite clay, polyaluminum chloride, polyaluminum hydroxychloride, aluminum chloride, aluminum chlorohydrate, aluminum sulfate, ferric chloride, ferric sulfate, and ferrous sulfate monohydrate.

According to some embodiments of the disclosure, a fixed film biological system may be used in conjunction with ballasted clarifiers to treat water or wastewater. The systems and methods of the present disclosure may be particularly advantageous, for example, in treatment plants where a small footprint is required such as, for example, a retrofit for industrial plants, small flow plants or package plants, hybrid wastewater plants, combining fixed film processes and activated sludge processes, and lagoon plants requiring nitrification. Also, this combination may be used in small flow systems that do not have significant operator interface yet require a high quality effluent. The use of a fixed film process in combination with ballasted settling is not limited to the examples given. Many uses in biological and chemical treatment of wastewater or potable water are possible.

In certain embodiments, a fixed film process followed by a ballasted flocculation process may be utilized for biological treatment of water or wastewater to remove at least one of nitrogen compounds, such as nitrates, biological oxygen demand (BOD), chemical oxygen demand (COD), and phosphorus compounds. Fixed film processes may oxidize ammonia to nitrate and/or reduce nitrate to nitrogen gas. Biological solids produced may then be removed in addition to dissolved, colloidal and particulate solids by the ballasted clarifiers. In certain embodiments, at least one of nitrogen compounds, such as nitrates, biological oxygen demand (BOD), chemical oxygen demand (COD), and phosphorus compounds may be removed prior to disinfection to provide potable water or drinking water to distribute it to a water supply grid.

Ballasted flocculation systems may comprise the addition of a coagulant, a ballast and, optionally, a flocculant to improve the removal of dissolved, colloidal, particulate and microbiological solids. In certain embodiments, the coagulant may be optional. For example, ballast and flocculant may be added, without coagulant. In other embodiments, ballast may be added without coagulant and flocculant. In some embodiments, ballast and coagulant may be added, without flocculant. In certain embodiments, a magnetic ballast may be used.

The enhanced settlability of these ballasted solids may provide for a small clarification step, which may allow for a small footprint system comprising biological and clarification steps. Recirculation of solids, either ballasted solids or ballast-free solids, to at least one of the ballasted flocculation processes, such as the ballast mixing step, and to the fixed film process can further enhance the reliability of the overall system. These features may be utilized in existing wastewater treatment plants, small flow plants or package plants, combined sewer overflow (CSO) treatment plants, new plants that require a small footprint, hybrid treatment plants (fixed film and activated sludge), and lagoon treatment plants requiring nitrification. One benefit is that an existing clarifier downstream of a fixed film process is readily convertible to a ballasted system using the system of the present disclosure. Conventional clarifiers may be even more readily convertible if the ballasted system uses a magnetic material, for example, magnetite, as the ballast.

In some embodiments of the disclosure, a system for treating wastewater is provided. The system comprises a fixed film reactor fluidly connected to a source of wastewater and configured to provide a fixed film effluent. A fixed film biological system may be employed which may comprise one or more fixed film reactors, which are utilized in parallel or in series, and in which one or more of the fixed film reactors is operational at a given point in time. In certain embodiments, the fixed film effluent may comprise about 50 mg/l to about 300 mg/l of biological solids. The fixed film effluent may flow to a ballasted flocculation system in which a source of coagulant may be fluidly connected to the fixed film effluent and configured to provide a coagulated effluent. The source of coagulant may be optional. A source of ballast may be fluidly connected to the coagulated effluent and configured to provide a ballasted effluent. In some embodiments, the source of ballast may be fluidly connected to at least one of the fixed film effluent or the coagulated effluent. The source of ballast may comprise a powdered ballast. The ballast may not be in a liquid such that it may be added in dry powdered form. In some embodiments, the ballast may be added by an operator or by machinery, such as by a dry feeder. It is to be understood that the source of ballast being fluidly connected to the fixed film effluent or the coagulated effluent, or to any effluent or wastewater stream of the system, may comprise the source of ballast may be in a dry (non-liquid) or powdered form. A clarifier may be fluidly connected to the ballasted effluent, the clarifier comprising a treated effluent outlet and a ballasted solids outlet and configured to separate a treated effluent from a ballasted solids. The ballasted solids outlet of the clarifier may be fluidly connected to at least one of the coagulated effluent and the fixed film reactor. In some embodiments, the ballasted solids outlet may be fluidly connected to the source of ballast.

Optionally, a source of flocculant may be fluidly connected to the ballasted effluent. At least one of the sources of coagulant, ballast and flocculant may be provided in line to a fixed film effluent stream. Alternately, tanks may be used such that the fixed film effluent flows to a coagulant tank, into which a coagulant is added from a source of coagulant. The coagulated effluent may then flow to a ballast tank, into which a ballast is added from a source of ballast. The ballasted effluent may then flow to a flocculant tank, into which a flocculant is added from a source of flocculant. The flocculant effluent may then flow to the clarifier. In certain embodiments, a flocculant tank and source of flocculant may not be included in the ballasted flocculation system, and the ballasted effluent may flow directly to the clarifier. In some embodiments, a coagulant tank and source of coagulant may not be included in the ballasted flocculation system.

As discussed above, the ballast may be a magnetic ballast. The magnetic ballast may comprise an inert material. The magnetic ballast may comprise a ferromagnetic material. The magnetic ballast may comprise iron-containing material. In certain embodiments, the magnetic ballast may comprise an iron oxide material. For example, the magnetic ballast may comprise magnetite ($Fe_3O_4$). The magnetic ballast may have a particle size that allows it to bind with biological flocs to provide enhanced settling or clarification, and allow it to be attracted to a magnet so that it may be separated from the biological flocs. The particle size of the magnetic ballast may be less than about 100 micrometers ($\mu m$). The particle size of the magnetic ballast may be less than about 40 µm. The particle size of the magnetic ballast may be less than about 20 µm.

Sand ballasted systems often implement larger ballast size to effectively recover the ballast. Ballast is also non-magnetic. Sand ballasted systems have also implemented the use of cleaning agents to separate the biological solids from the sand particles. This could be a result of a large surface for bacteria to attach, requiring more than shearing forces of a vortex mechanism alone to remove biological solids from the sand particle surface, or the need to dissolve chemical bonds that assist in the binding of the ballast.

Unlike sand based ballast that requires growth of floc around relatively large size sand particles, magnetite ballast can be used with small size, such as less than about 100 µm, allowing for the magnetite particles to impregnate existing floc. The result may be an enhanced separation of flocculants. The ballasted effluent or the flocculant effluent may be directed to at least one clarifier where ballasted solids, such as magnetite ballasted solids, may be removed by gravity at an enhanced rate greater than conventional gravity clarifiers. The clarifier, being configured to provide a treated effluent and a ballasted solids, may be fluidly connected to at least one of the source of ballast, the coagulated effluent, and the fixed film reactor. In certain embodiments, the ballasted solids outlet of the clarifier may be fluidly connected to at least one of the coagulated effluent and the fixed film reactor. This may allow at least a portion of the ballasted solids to return to the fixed film biological system and to the source of ballast, for example, the ballast tank connected to a source of ballast. A portion of the biological solids may also be removed from the system. This may involve utilizing a magnetic separation apparatus, which may allow recovery of magnetic particles, which would not be feasible with, for example, sand particles. In certain embodiments, mechanical shearing may be employed to shear the biological solids prior to ballast recovery, for example, prior to magnetite recovery. In some instances, such as re-seeding and high flow events, a portion of the settled biological solids may be recycled to the front of the fixed film system. These solids may either be ballasted or solids stripped of magnetite through the magnetic separation. In certain embodiments, such as small-scale operations, it may not be necessary or feasible to recover the ballast, such as the magnetic ballast from the system.

In certain embodiments, the system may be configured to treat between about 200 gallons per day per square foot of a surface area of the clarifier to about 2,000 gallons per day per square foot of the surface area of the clarifier. In certain embodiments, the system may be configured to treat between about 200 gallons per day per square foot of a surface area of the clarifier to about 6,000 gallons per day per square foot of the surface area of the clarifier. In certain other embodiments, the system may be configured to treat between about 100 gallons per day per square foot of a surface area of the clarifier to about 36,000 gallons per day per square foot of a surface area of the clarifier.

In certain embodiments, a ballasted recovery system may be positioned downstream of the ballasted solids outlet of the clarifier. The ballasted recovery system may be positioned upstream of at least one of the source of ballast and the fixed film reactor.

In certain embodiments, the use of a magnetic ballast provides advantages over use of other ballast materials. For example, the use of a magnetic ballast provides for enhanced removal of biological solids from the ballast. For example, a magnetic drum may be used to separate the biological solids from the magnetic ballast. Optionally, mechanical shearing may be utilized prior to separation. This process may sufficiently remove the biological solids from the ballast. Recirculation of settled solids to the reaction tanks further enhances performance and reliability while the optional recycle to the fixed film system, whether with ballasted or ballast-free solids, allows for additional flexibility for treatability and recovery in process upsets or startups. In certain embodiments, cleaning solutions may be unnecessary in separating ballast from the biological solids.

A system for treating wastewater is shown in FIG. 1. A source of wastewater, stream 1, which may be screened wastewater or primary clarification effluent, enters fixed film biological system or fixed film reactor 4. Fixed film reactor 4 may comprise a moving bed bioreactor, a trickling filter, or a rotating biological contactor, for example. Soluble substrate may be oxidized or reduced to biological solids in the form of, for example, a slough, from the fixed biomass on an inert carrier or sheet of fixed film reactor 4. Aeration may be supplied in aerobic zones to supply oxygen and mixing for the reactor 4. In the case of anaerobic or anoxic based systems, mixers can be provided to keep the system fully mixed. Fixed film effluent 5 exits the reactor 4. Fixed film effluent 5 comprises wastewater and solids produced in reactor 4. Fixed film effluent 5 enters a series of feed reaction areas which may be inline or utilize tanks.

Source of coagulant 7, such as metal or prehydrolized metal salt, is added in reaction area 6 to provide a coagulated effluent. Following coagulation addition 6, flow continues on to ballast reaction area 8. Source of ballast, is introduced to provide a ballasted effluent. The source of ballast may comprise raw ballast 9, recycled or recovered ballast 10, recycled ballasted solids 11, or combinations thereof. The ballast may comprise a magnetic material. The ballast may comprise a ferrous material. The ballast may comprise magnetite ($Fe_3O_4$). The ballast may be in powdered form. Raw ballast 9, or fresh ballast, is ballast that has not before been introduced to the waste system. Recycled or recovered ballast 10 is ballast that is separated from solids in another part of the system, for example, recovery system 20, described below, and recycled to the ballast reaction area. Ballasted solids comprise biological solids impregnated or partially impregnated with ballast. Recycled ballasted solids 11 are ballasted solids returned to the ballast reaction area 8 from an outlet of the clarifier 15 without first being introduced to a recovery system 20 for separation.

After ballast addition 8, source of flocculant 13 may optionally be added in flocculant reaction area 12 to further flocculate solids and ballasted solids prior to being introduced into clarifier 15. Flocculant 13 may comprise a polymer.

As discussed below, clarifier 15 incorporated into the wastewater treatment system may be a converter or retrofitted clarifier. The details and particular components of the clarifier may be chosen by a person of ordinary skill in the art as required. The clarifier may, for example, comprise lamella. The clarifier may be configured to separate treated effluent 16 from ballasted solids 24 and comprises outlet 26 for treated effluent 16 and outlet 28 for ballasted solids. Solids settle in clarifier 15 and separated treated effluent 16 continues on to further disinfection if required. A portion of the settled solids may be recycled ballasted solids 11 returned to ballast reaction area 8. In addition or in the alternative, another portion of the ballasted solids 23 may be recycled to fixed film system 4.

At least a portion of settled solids 17 may be introduced into a ballast recovery system 20. Optionally, settled solids 17 may first be introduced to mechanical shearing device 19 to aid in breaking up the ballast and non-ballast components of the settled solids. Alternatively, the mechanical shearing device 19 may be by-passed by stream 18. The ballast recovery system 20 may comprise a magnetic separator. For example, the separator may be a wet drum magnetic separator. In a wet drum magnetic separator, magnetic ballast adheres to the surface of a rotatable drum and is directed to a separate outlet from nonmagnetic components, or ballast-free solids, of the feed. Stripped solids may comprise waste sludge 21 that exits the system 20 for further solid waste treatment and disposal. A portion of these stripped solids, or ballast-free solids, may optionally be recycled to fixed film system 4 via optional feed line 22. It should be understood that ballast-free solids refers to solids that have a majority portion of the ballast removed from the solids. In some embodiments, at least about 90% of the ballast has been removed. In other embodiments, at least about 95% of the ballast has been removed.

Additional optional components include clarifier 3 fluidly upstream of fixed film system 4, and bypass line 2 which may allow stream 1 to bypass fixed film system 4 if necessary, for example, during a high flow event, such as a rainfall or storm event.

In certain embodiments of the present disclosure, a method of treating a wastewater may be provided. The wastewater may be treated at a of between about 200 gallons per day per square foot of a surface area of the clarifier to about 2,000 gallons per day per square foot of the surface area of the clarifier. In certain embodiments, the system may be configured to treat between about 200 gallons per day per square foot of a surface area of the clarifier to about 6,000 gallons per day per square foot of the surface area of the clarifier. In certain other embodiments, the system may be configured to treat between about 100 gallons per day per square foot of a surface area of the clarifier to about 36,000 gallons per day per square foot of a surface area of the clarifier. In certain embodiments, the rate may be an average rate over a predetermined period of time. The method may comprise introducing a source of wastewater to a fixed film reactor to provide a fixed film effluent. The fixed film effluent may comprise about 50 mg/l to about 300 mg/l of biological solids. In other examples, the fixed film may comprise about 50 mg/l to about 2,000 mg/l. The method may further comprise optionally adding a coagulant to provide a coagulated effluent. In some embodiments, the coagulant may be added to the fixed film effluent. The method may further comprise adding a ballast to provide a ballasted effluent. In some embodiments, the ballast may be added to at least one of the fixed film effluent and the coagulated effluent. The ballast may comprise a magnetic material. The ballast may comprise magnetite. The method may further comprise separating the ballasted effluent into a treated effluent and a ballasted solids in a clarifier. The ballasted solids may include a small amount of residual ballast-free solids and other residual components, as separation processes and ballasting processes will never be perfectly complete. The method may further comprise separating the ballasted solids into a recovered ballast and a ballast-free solids. Once again, the recovered ballast may also comprise some residual non-ballast components. Likewise, the ballast-free solids may comprise some residual ballast. The method may further comprise adding the recovered ballast to the coagulated effluent.

The method may also further comprise adding a flocculant to the ballasted effluent. The method may also further comprise adding a portion of the ballast-free solids to at least one of the source of wastewater, the fixed film effluent, and the coagulated effluent. The method may also further comprise adding a portion of the ballasted solids to at least one of the source of wastewater, the fixed film effluent, and the coagulated effluent. The method may also further comprise adding a portion of the ballast-free solids to at least one of the source of wastewater and the coagulated effluent. The method may also further comprise adding a portion of the ballasted solids to at least one of the source of wastewater and the coagulated effluent.

Wastewater treatment systems and methods such as those disclosed above may be accomplished by constructing reaction tanks directly inside a clarifier. This clarified unit may be constructed as part of a new wastewater treatment system or may be constructed as part of a retrofitting. Such a configuration may address potential obstacles to the disclosed wastewater systems and methods including locating the reaction tanks, and minimizing the length of pipe run between the reaction tanks and clarifier. The tanks could be constructed of mild steel, concrete, stainless steel, fiberglass, or the like. Construction of reaction tanks directly inside a clarifier would minimize the footprint and capital cost associated with installation of the disclosed system, particularly in cases where existing clarifiers would require modifications to make them work better in a ballasted flocculation system. These existing clarifiers are often oversized for the task of settling ballasted floc, and therefore the extra space may be used to incorporate reaction tanks by installing the reaction tanks inside the clarifiers. This effectively reduces the hydraulic retention time of the over-sized clarifiers, minimizes the required footprint of the water treatment system installation, and provides the opportunity to use common wall construction to further reduce capital cost. Clarifiers designed for ballasted clarification do not typically include scum collection systems, so there would be no interference of the reaction tanks with such a system.

Figure 2:
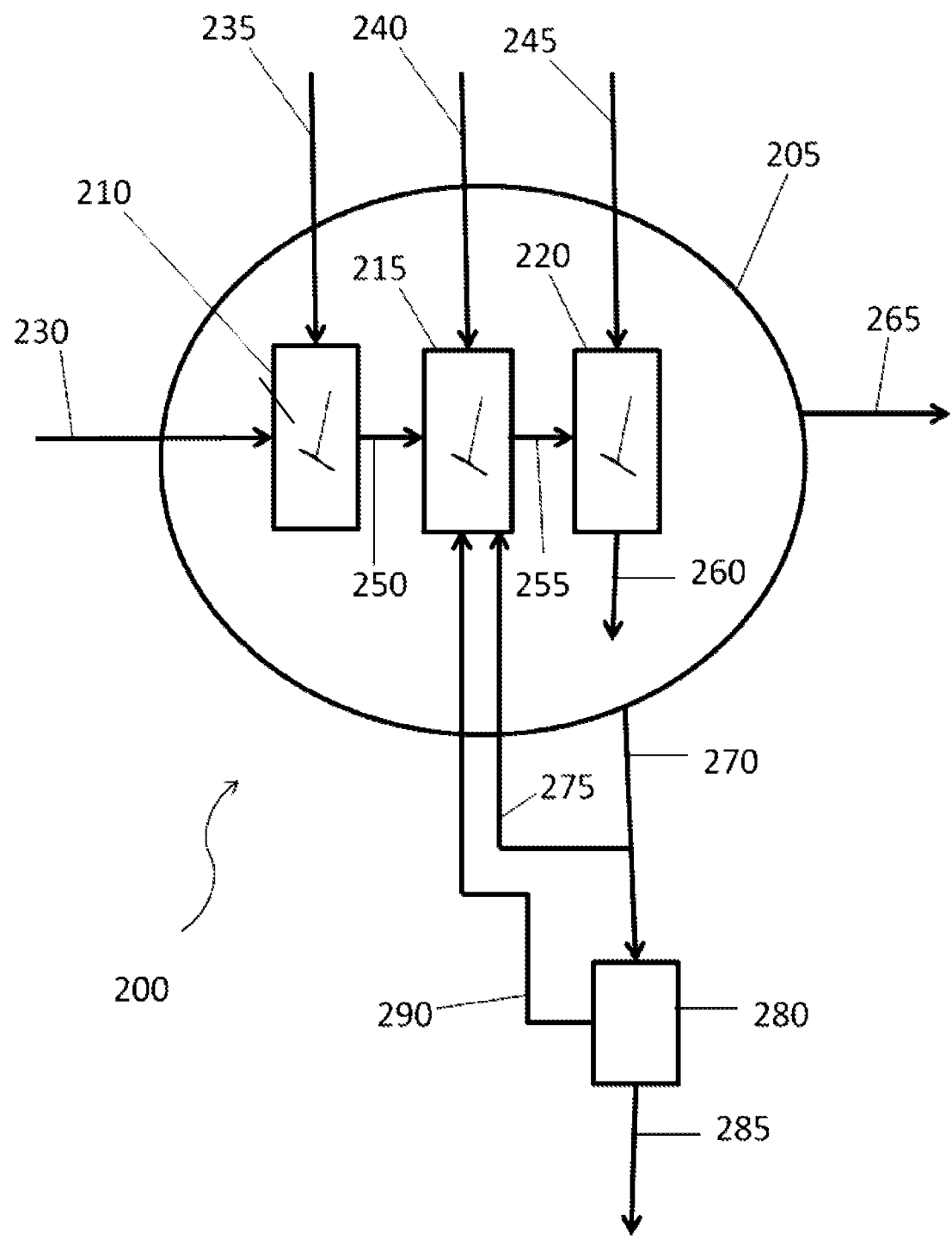
FIG. 2 presents a schematic of reaction tanks integrated into a clarifier tank in accordance with one or more embodiments of the disclosure.

A schematic of an embodiment of a system is shown in FIG. 2. System 200 comprises clarifier 205. Integrated into clarifier 205 may be coagulation tank 210, ballast feed tank 215, and flocculation tank 220. Source of coagulant 235 may be fluidly connected to coagulation tank 210. Source of ballast 240 may be fluidly connected to ballast feed tank 215. The ballast may comprise a magnetic material. For example, the ballast may comprise magnetite. The magnetite may be in powdered form. Source of ballast 240 may be introduced to ballast feed tank 215. For example, the delivery may be accomplished automatically through a control system or manually. The delivery of ballast may be continuous or it may be intermittent. Likewise, for coagulant and flocculant delivery may be automatic or manual, and continuous or intermittent. Optionally, source of flocculant 245 may be fluidly connected to an optional flocculation tank 220. The flocculant may comprise, for example, a polymer. While the present embodiment has all three tanks incorporated into the clarifier, other combinations are possible. For example, coagulant tank 210 may be located outside clarifier 205, and flocculant tank 220 is optional.

Similar to FIG. 1, effluent 230 may enter coagulation tank 210, which may provide coagulated effluent stream 250. Stream 250 may enter ballast mixing tank 215, which may provide ballasted effluent stream 255. Stream 255 may enter flocculation tank 220, which may provide flocculated effluent stream 260. Stream 260 may then enter the clarification portion of clarifier 205. Treated effluent stream 265 may exit clarifier 205. Meanwhile, a separate ballasted solids stream 270 may exit clarifier 205 at a different outlet from that of treated effluent stream 265. A portion of the ballasted solids may be diverted to a returned ballasted solids stream 275 that may feed ballast feed tank 215. At least a portion of the ballasted solids stream 270 may be directed to ballast recovery system 280. The ballast recovery system 280 may produce a recovered ballast stream 290 which may be directed to ballast feed tank 215. The ballast recovery system 280 may produce a ballast-free solids stream 285, or solids waste stream, directed for further processing or returned to a part of the waste treatment system.

In certain embodiments of the present disclosure, a method of retrofitting a wastewater treatment system may be provided. The wastewater treatment system may comprise a fixed film bioreactor and a clarifier positioned downstream of the fixed film bioreactor. The clarifier may comprise a solids outlet. The method may comprise installing a coagulation tank in the clarifier. The method may further comprise installing a ballast feed tank connected downstream of the coagulant tank in the clarifier. The method may further comprise connecting the solids outlet of the clarifier to the ballast feed tank. The method may further comprise installing a ballast recovery system downstream of the solids outlet of the clarifier and upstream of the ballast feed tank. The method may further comprise installing a flocculation tank in the secondary clarifier connected downstream of the ballast feed tank.

The function and advantage of these and other embodiments of the systems and techniques disclosed herein will be more fully understood from the example below. The following example is intended to illustrate the benefits of the disclosed treatment approach, but do not exemplify the full scope thereof.

EXAMPLES

Example 1

A wastewater stream from a source of wastewater was delivered to three fixed film moving bed bioreactor (MBBR) tanks in series after passing through coarse screening, grit removal, and a fine screen. The screened water was pumped to the MBBR tanks at an average flow rate of 2.1 gallons per minute (GPM). The flow then passed through a 6 foot diameter by 7 foot deep secondary clarifier. Samples were taken from the effluent prior to being passed through the secondary clarifier. The samples were placed into liter beakers with coagulant dosages of 10 to 60 ppmv, with ferric chloride as the coagulant. Magnetite at 10 g/L was added to each beaker. The samples were mixed for three to six minutes, and then allowed to settle. All samples settled rapidly in 15 to 30 seconds, with settling results ranged from 0.2 to 2.9 mg/L effluent total suspended solids. All effluent in the beakers appeared clear at each does of coagulant.

These results may be compared to a fixed film MBBR system that is followed by a secondary clarifier in which about 90 ppmv of ferric chloride is used, which results in an effluent of the clarifier having 25 to 35 mg/L total suspended solids.

These results show that using a fixed film MBBR process in conjunction with a magnetic ballast system enhanced the quality of the treated water, reducing the total suspended solids. This process also required less coagulant to be used in the process. This system provides enhanced treatment of the water as well as provide cost savings in terms of using less coagulant than a conventional system.

Example 2

Wastewater was processed through a treatment system comprising a trickling filter and a secondary clarifier. The flow rate of wastewater entering the trickling filter was about 600 GPM to about 700 GPM. A coagulant (alum) was added to the effluent of the trickling filter at concentrations ranging from about 100 ppmv to about 300 ppmv. Fifty GPM of effluent from the trickling filter was diverted to a process comprising a ballasted flocculation system in which magnetite was added to the trickling filter effluent.

Data regarding biological oxygen demand (BOD) was measured for a system including a trickling filter whose effluent was either treated in a ballasted flocculation system or a secondary clarifier. Samples were taken over a two week period. This data is shown in Table 1.

TABLE 1

| Sample | BOD in Feed to Trickling Filter (mg/l) | BOD in Effluent after Trickling Filter into Ballasted Flocculation (mg/l) | BOD in Effluent after Ballasted Flocculation (mg/l) | BOD in Effluent from Secondary Clarifier (mg/l) |
|---|---|---|---|---|
| 1 | 75 | 51 | 3 | Not tested |
| 2 | 87 | 46 | 4 | 22 |
| 3 | 81 | 28.1 | 9.55 | 12 |
| 4 | Not tested | 20.6 | 3.9 | 10 |
| 5 | 91.4 | 29.6 | 2.6 | 4 |

As shown above in Table 1, the BOD of the effluent after treatment with the ballasted flocculation system was improved over effluent that was treated with a secondary clarifier. These results demonstrate the improved treated water product that may be obtained by using the ballasted flocculation process over a conventional secondary clarifier.

Data was also collected from testing using the ballasted flocculation system and is shown in Tables 2-5.

TABLE 2

| Sample | Total Suspended Solids in Feed to Trickling Filter (mg/l) | Total Suspended Solids in Effluent of Trickling Filter, going into Ballasted Flocculation (mg/l) | Total Suspended Solids in Effluent after Ballasted Flocculation (mg/l) |
|---|---|---|---|
| 1 | 117 | 110 | 3 |
| 2 | 127 | 89 | 73* |
| 3 | 110 | 95 | 3 |
| 4 | 40 | 43 | 4 |
| 5 | 45 | 34 | 2 |

*In this run, no alum was added.

As shown above in Table 2, total suspended solids was decreased substantially through use of the ballasted flocculation process.

TABLE 3

| Sample | Total Phosphorous from Trickling Filter Effluent, going into Ballasted Flocculation (mg/l) | Total Phosphorous in Ballasted Flocculation Clarifier Effluent (mg/l) |
|---|---|---|
| 1 | 5.46 | 0.061 |
| 2 | 5.34 | 0.131 |
| 3 | 4.66 | 0.047 |
| 4 | 3.97 | 2.36 |
| 5 | 4.01 | 0.314 |

As shown in Table 3, phosphorus levels were reduced through use of the ballasted flocculation process.

TABLE 4

| Sample | Turbidity in Trickling Filter Effluent, going into Ballasted Flocculation (NTU) | Turbidity in Effluent after Ballasted Flocculation (NTU) |
|---|---|---|
| 1 | 95 | 3.1 |
| 2 | 65 | 8.9 |
| 3 | 40 | 12.5 |
| 4 | 40 | 4.1 |
| 5 | 50 | Not tested |

As shown in Table 4, turbidity was reduced through use of the ballasted flocculation system.

While exemplary embodiments of the disclosure have been disclosed, many modifications, additions, and deletions may be made therein without departing from the spirit and scope of the disclosure and its equivalents, as set forth in the following claims.

Those skilled in the art would readily appreciate that the various configurations described herein are meant to be exemplary and that actual configurations will depend upon the specific application for which the system and methods of the present disclosure are used. Those skilled in the art will recognize, or be able to ascertain using no more than routine experimentation, many equivalents to the specific embodiments described herein. For example, those skilled in the art may recognize that the system, and components thereof, according to the present disclosure may further comprise a network of systems or be a component of a wastewater treatment system. It is, therefore, to be understood that the foregoing embodiments are presented by way of example only and that, within the scope of the appended claims and equivalents thereto, the disclosed system and methods may be practiced otherwise than as specifically described. The present system and methods are directed to each individual feature or method described herein. In addition, any combination of two or more such features, apparatus or methods, if such features, system or methods are not mutually inconsistent, is included within the scope of the present disclosure.

Further, it is to be appreciated various alterations, modifications, and improvements will readily occur to those skilled in the art. Such alterations, modifications, and improvements are intended to be part of this disclosure, and are intended to be within the spirit and scope of the disclosure. For example, an existing facility may be modified to utilize or incorporate any one or more aspects of the disclosure. Thus, in some cases, the apparatus and methods may involve connecting or configuring an existing facility to comprise at least one of a fixed film system, a clarifier, and a ballasted flocculation system. Accordingly, the foregoing description and drawings are by way of example only. Further, the depictions in the drawings do not limit the disclosures to the particularly illustrated representations.

As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The invention claimed is:

1. A method for treating wastewater, comprising:
introducing a source of wastewater to a fixed film biological reactor to provide a fixed film effluent;
adding a magnetic ballast to the fixed film effluent to provide a ballasted effluent;
separating the ballasted effluent into a treated effluent and ballasted solids in a clarifier;
magnetically separating the ballasted solids into recovered ballast and ballast-free solids;
adding at least a portion of the ballast-free solids to the source of wastewater; and
adding at least a portion of the recovered ballast to the fixed film effluent,
wherein no cleaning solution is used for ballast recovery.

2. The method of claim 1, further comprising adding a flocculant to the ballasted effluent.

3. The method of claim 1, further comprising adding a coagulant to the fixed film effluent to provide a coagulated effluent.

4. The method of claim 3, further comprising adding a portion of the ballast-free solids to at least one of the fixed film effluent, and the coagulated effluent.

5. The method of claim 3, further comprising adding a portion of the ballasted solids to at least one of the source of wastewater, the fixed film effluent, and the coagulated effluent.

6. The method of claim 1, wherein the fixed film effluent comprises 50 mg/l to 300 mg/l of biological solids.

7. The method of claim 1, wherein the ballast comprises magnetite.

8. The method of claim 1, wherein the wastewater is treated at a rate of between 200 gallons per day per square foot of a surface area of the clarifier to 6,000 gallons per day per square foot of the surface area of the clarifier.

9. The method of claim 1, wherein the magnetic ballast has a particle size of less than 40 μm.

10. The method of claim 9, wherein the magnetic ballast has a particle size of less than 20 μm.

11. The method of claim 1, wherein the magnetic ballast is added in a dry or powdered form.

12. The method of claim 1, further comprising subjecting the ballasted solids to mechanical shearing prior to magnetic separation.

13. The method of claim 1, wherein at least one of a coagulation tank, a ballast feed tank, and a flocculation tank is integrated into the clarifier.

14. The method of claim 1, further comprising bypassing the fixed film biological reactor during a high flow event.

15. The method of claim 1, further comprising subjecting the wastewater to clarification upstream of the fixed film biological reactor.

* * * * *